3,045,052
TRINITROMETHYL 2,4-DINITROPHENYL SULFIDE

Howard A. Hageman, Englewood, N.J., assignor to United States Rubber Company, New York, N.Y., a corporation of New Jersey
No Drawing. Filed June 26, 1951, Ser. No. 233,681
1 Claim. (Cl. 260—609)

This invention relates to a new compound, trinitromethyl 2,4-dinitrophenyl sulfide. This new compound is useful as an explosive and/or propellant.

The said new compound is made by reacting the silver salt of trinitromethane with 2,4-dinitrobenzenesulfenyl chloride, preferably is equimolar amounts, in an inert solvent. Silver chloride precipitates immediately, and is removed conveniently by filtration. The desired product is easily isolated by evaporation of the solvent, followed by recrystallization of the residue from an appropriate solvent. The trinitromethyl 2,4-dinitrophenyl sulfide is thus obtained in high yield.

The reaction takes place as follows:

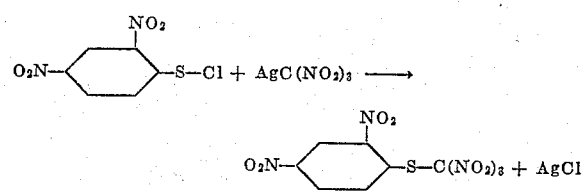

The following example discloses a method of making my new compound.

Example

A solution of 5.16 g. of the silver salt of trinitromethane in 100 ml. of ether is added to a solution of 4.68 g. of 2,4-dinitrobenzenesulfenyl chloride in 100 ml. of ether, causing the immediate precipitation of silver chloride. The solution is filtered and evaporated to dryness. The residue is recrystallized from a mixture of chloroform and cyclohexane, giving 5.0 gm., or 72% yield, of trinitromethyl 2,4-dinitrophenyl sulfide, a yellow solid melting at 70° C. The new compound detonates readily on being struck with a hammer, and burns with a brilliant flash.

Analysis:

|  | Calcd. for $C_7H_3N_5O_{10}S$, percent | Found, percent |
| --- | --- | --- |
| Carbon | 24.1 | 24.9 |
| Hydrogen | 0.9 | 1.4 |
| Nitrogen | 20.1 | 18.8 |
| Sulfur | 9.2 | 8.5 |

The agreement between the observed and the calculated values is satisfactory considering the difficulty of analyzing polynitro compounds containing sulfide sulfur. Nitrogen and sulfur analyses are usually somewhat below the theoretical values, and carbon and hydrogen correspondingly above.

I claim:

Trinitromethyl 2,4-dinitrophenyl sulfide.

References Cited in the file of this patent

Buckley et al.: J. Chem. Soc. (London), pp. 1477–1481 (1947).